United States Patent
Lim et al.

(10) Patent No.: US 12,256,055 B2
(45) Date of Patent: Mar. 18, 2025

(54) PATCH-BASED DEPTH MAPPING METHOD AND APPARATUS FOR HIGH-EFFICIENCY ENCODING/DECODING OF PLENOPTIC VIDEO

(71) Applicant: KOREA ELECTRONICS TECHNOLOGY INSTITUTE, Seongnam-si (KR)

(72) Inventors: Sung-Gyun Lim, Goyang-si (KR); Yong Hwan Kim, Anyang-si (KR); Hyun-Ho Kim, Seongnam-si (KR); Yura Kim, Hwaseong-si (KR)

(73) Assignee: Korea Electronics Technology Institute, Gyeongg-do (KR)

( * ) Notice: Subject to any disclaimer, the term of this patent is extended or adjusted under 35 U.S.C. 154(b) by 1 day.

(21) Appl. No.: 18/332,596

(22) Filed: Jun. 9, 2023

(65) Prior Publication Data
US 2024/0195947 A1 Jun. 13, 2024

(30) Foreign Application Priority Data
Dec. 12, 2022 (KR) .................. 10-2022-0172373

(51) Int. Cl.
*H04N 13/161* (2018.01)
*H04N 19/136* (2014.01)

(52) U.S. Cl.
CPC ......... *H04N 13/161* (2018.05); *H04N 19/136* (2014.11)

(58) Field of Classification Search
CPC .. H04N 13/161; H04N 19/136; H04N 13/232; H04N 19/597; H04N 19/85; H04N 23/957; H04N 13/128; H04N 13/178; H04N 13/189; H04N 13/194; H04N 19/184; H04N 19/30
See application file for complete search history.

(56) References Cited

U.S. PATENT DOCUMENTS 9,113,043 B1 * 8/2015 Kim ................. G06T 15/08
2022/0132056 A1 * 4/2022 Zahnert ............. H04N 25/46

* cited by examiner

*Primary Examiner* — Dramos Kalapodas
(74) *Attorney, Agent, or Firm* — Knobbe, Martens, Olson & Bear, LLP

(57) ABSTRACT

A patch based depth mapping method and apparatus for high-efficiency encoding/decoding of a plenoptic video is proposed. The method may be performed in an electronic apparatus to classify a reference image and an additional image from a plenoptic video during encoding the plenoptic video and then generate an atlas including a patch using the additional image. The method may include mapping a depth value by applying minimum-maximum linear scaling in units of an input viewpoint image. The method may also include finding a minimum value and a maximum value of the depth value per the patch and remapping the depth value through minimum-maximum linear scaling.

20 Claims, 6 Drawing Sheets

PATCH-BASED DEPTH MAPPING METHOD AND APPARATUS FOR HIGH-EFFICIENCY ENCODING/DECODING OF PLENOPTIC VIDEO

CROSS-REFERENCE TO RELATED APPLICATION

This application claims priority to and the benefit of Korean Patent Application No. 10-2022-0172373, filed on Dec. 12, 2022, the disclosure of which is incorporated herein by reference in its entirety.

BACKGROUND

Technical Field

The present disclosure relates to a technique for encoding/decoding a plenoptic video, and more particularly, to a technology for generating an atlas by mapping depth values for each patch to reduce loss of depth information occurring during encoding/decoding of a plenoptic video.

Description of Related Technology

Recently, as one of the 3D image technologies, immersive media, plenoptic technology has been introduced. In this case, the plenoptic image is an image that provides information on light traveling in an arbitrary direction in space. That is, the plenoptic image includes angular domain information based on direction information along with depth information of a spatial domain of a 2D image. Various image processing such as perspective viewing change, refocusing, and 3D depth of field extraction may be performed using the depth information of the spatial domain and the additional direction information of rays based on the angular domain.

SUMMARY

One aspect is a high-efficiency encoding/decoding technique for a plenoptic video, which maps depth values per patch to generate an atlas so as to reduce a loss of depth information occurring during encoding/decoding of the plenoptic video.

Another aspect is a technique for mapping depth values in a minimum-maximum linear scaling method in units of patches during a pre-processing process for encoding a plenoptic video.

Another aspect is a syntax for storing and transmitting a minimum value and a maximum value of a depth value per patch and a technique for restoring original depth information by using them in a decoder.

Another aspect is a method performed in an electronic apparatus to classify a reference image and an additional image from a plenoptic video during encoding the plenoptic video and then generate an atlas including a patch using the additional image, the method including a first step of mapping a depth value by applying minimum-maximum linear scaling in units of an input viewpoint image; and a second step of finding a minimum value (patchMinDepth) and a maximum value (patchMaxDepth) of the depth value per the patch and remapping the depth value through minimum-maximum linear scaling.

The second step may include storing information of a minimum value and a maximum value of the depth value before mapping the depth value per the patch in metadata.

The method according to an embodiment of the present disclosure may further include performing the second step only when a size of the patch exceeds a predetermined threshold value.

The second step may include mapping a first depth value $d_{original}$ which is a depth value for a specific point in the patch according to the first step within a range of a minimum value to a maximum value of the depth value per the patch to a second depth value $d_{mapped}$ which is a depth value according to the mapping of the patch, in which the first depth value $d_{original}$ is mapped to the second depth value $d_{mapped}$ according to a magnification f at which a dynamic range of the depth value per the patch is extended.

The second depth value $d_{mapped}$ may be obtained using Equation 1 below:

$$d_{mapped} = f \times (d_{original} - \text{patchMinDepth}) \qquad \text{(Equation 1)}$$

(where, patchMinDepth represents a minimum value of the patch according to the second step).

The magnification f can be limited within a predetermined range, and a value of f according to the limitation can be obtained using Equation 2 below:

$$f = \min\left(2^n, \ \frac{(2^b - 1)}{\text{patchMaxDepth} - \text{patchMinDepth}}\right) \qquad \text{(Equation 2)}$$

(where, min(A, B) represents a smaller value among A and B, a minimum value and a maximum value of the depth value are respectively mapped to 0 and $2^b - 1$ in the first step, b is a natural number of 2 or more as a bit depth for expressing the depth value, patchMaxDepth represents the maximum value of the patch according to a second improvement technique, and n may be a value of 0 to m ($0 \leq n \leq m$). Where, m may be a real number of 1.0 or more).

The minimum value and the maximum value of the depth value per patch may be a minimum value and a maximum value in a predetermined number of image frame units.

The second step may include storing in metadata (patchMinDepth$_i$-patchMinDepth$_{i-1}$, patchMaxDepth$_i$-patchMaxDepth$_{i-1}$) which is a difference between (patchMinDepth$_i$, patchMaxDepth$_i$) which is a (minimum value, maximum value) of the depth value in an $i^{th}$ patch where i is a natural number of 2 or more and (patchMinDepth$_{i-1}$, patchMaxDepth$_{i-1}$) which is a (minimum value, maximum value) of the depth value in an (i−1)th patch.

In the second step, any one of the minimum value (patchMinDepth) and the maximum value (patchMaxDepth) of the depth value per patch, and a range of the depth value per patch (patchDepthRange=patchMaxDepth−patchMinDepth) may be respectively stored in metadata.

In the second step, (patchMinDepth−lastPatchMinDepth, patchDepthRange−lastPatchDepthRange) which is a difference between (patchMinDepth, patchDepthRange) which is the (minimum value, range) of the depth value per patch and (lastPatchMinDepth, lastPatchDepthRange) which is the (minimum value, range) of the depth value per patch previously stored last may be stored in metadata. In this case, the initial value of the (lastPatchMinDepth, lastPatchDepthRange) which is the (minimum value, range) of the depth value per patch previously stored last may be set to (viewMinDepth, viewDepthRange=viewMaxDepth−viewMinDepth) which is the (minimum value, range) of the depth value of the viewpoint image attributable to the first patch. The value of (lastPatchMinDepth, lastPatchDepthRange) may be updated after calculating (patchMinDepth, patchMaxDepth) for each patch that uses depth scaling in the encoding or decoding process. The method according to an embodiment of the present disclosure may further include selectively performing the second step with respect to a corresponding patch or a corresponding input viewpoint image according to a depth image characteristic of an input sequence.

The selectively performing may include a step in which the second step is not performed if the depth information of the input sequence is less than or equal to a certain degree of accuracy.

The selectively performing may include a step in which if a histogram of the depth image of the input sequence has a sample distribution interval equal to or greater than a predetermined level, the second step is not performed.

Another aspect is a method performed by an electronic apparatus to perform encoding on a plenoptic video, the method including generating an atlas including a patch by classifying a reference image and an additional image from the plenoptic video and then by using the additional image; generating an encoding code by encoding the reference image and the atlas using a 2D video codec; and storing information including the encoding code and metadata or generating the information as a bit-stream and transmitting it to other apparatus, wherein the generating an atlas may include a first step of mapping a depth value by applying minimum-maximum linear scaling in units of an input viewpoint image; and a second step of finding a minimum value (patchMinDepth) and a maximum value (patchMaxDepth) of the depth value per the patch and remapping the depth value through minimum-maximum linear scaling, wherein the second step may include storing information of a minimum value and a maximum value of the depth value before mapping the depth value per the patch in the metadata.

An apparatus according to an embodiment of the present disclosure includes a memory storing a plenoptic video; and a controller configured to control to classify a reference image and an additional image from the plenoptic video during encoding the plenoptic video and then generate an atlas including a patch using the additional.

The controller may be configured to control execution of a first improvement process of mapping a depth value by applying minimum-maximum linear scaling in units of an input viewpoint image, control execution of a second improvement process of finding minimum and maximum depth values per the patch and remapping the depth values through minimum-maximum linear scaling, and control to store information of a minimum value and a maximum value of the depth value before mapping the depth value per the patch in metadata when the second improvement process is performed.

The controller may be configured to control to, when the second improvement process is performed, map a first depth value $d_{original}$ which is a depth value for a specific point in the patch according to the first improvement process within a range of a minimum value to a maximum value of the depth value per the patch to a second depth value $d_{mapped}$ which is a depth value according to the mapping of the patch, in which the first depth value $d_{original}$ is mapped to the second depth value $d_{mapped}$ according to a magnification f at which a dynamic range of the depth value per the patch is extended.

The controller may be configured to control to store in metadata (patchMinDepth$_i$–patchMinDepth$_{i-1}$, patchMaxDepth$_i$–patchMaxDepth$_{i-1}$) which is a difference between (patchMinDepth$_i$, patchMaxDepth$_i$) which is a (minimum value, maximum value) of the depth value in an i$^{th}$ patch where i is a natural number of 2 or more and (patchMinDepth$_{i-1}$, patchMaxDepth$_{i-1}$) which is a (minimum value, maximum value) of the depth value in an (i−1)th patch when the second improvement process is performed.

The controller may be configured to control to store any one of the minimum value (patchMinDepth) and the maximum value (patchMaxDepth) of the depth value per patch, and a range of the depth value per patch (patchDepthRange=patchMaxDepth−patchMinDepth) in metadata, respectively, when the second improvement process is performed.

The controller may be configured to, when the second improvement process is performed, control to: store in metadata (patchMinDepth−lastPatchMinDepth, patchDepthRange−lastPatchDepthRange) which is a difference between (patchMinDepth, patchDepthRange) which is the (minimum value, range) of the depth value per patch and (lastPatchMinDepth, lastPatchDepthRange) which is the (minimum value, range) of the depth value per patch previously stored last, set the initial value of the (lastPatchMinDepth, lastPatchDepthRange) which is the (minimum value, range) of the depth value per patch previously stored last to (viewMinDepth, viewDepthRange=viewMaxDepth−viewMinDepth) which is the (minimum value, range) of the depth value of the viewpoint image attributable to the first patch, and update the value of (lastPatchMinDepth, lastPatchDepthRange) after calculating (patchMinDepth, patchMaxDepth) for each patch that uses depth scaling in the encoding or decoding process. The controller may be configured to control to selectively perform the second improvement process on the corresponding patch or the corresponding input viewpoint image according to a depth image characteristic of an input sequence.

The present disclosure configured as described above has an advantage of reducing loss of depth information occurring during encoding/decoding of a plenoptic video by generating an atlas by mapping depth value per patch.

In addition, the present disclosure has an advantage in that by performing a minimum-maximum linear scaling of a depth value in units of a patch for effective depth information representation, thereby improving a method of taking the method of minimum-maximum linear scaling of a depth value in units of an input viewpoint image, the depth value can be expressed more accurately with a wider dynamic range.

That is, the present disclosure has an advantage of enabling efficient plenoptic video encoding/decoding by minimizing depth information loss in the encoding process by performing minimum-maximum linear scaling of a depth value in units of a patch.

In addition, the present disclosure has an advantage of objectively and subjectively improving the image quality of a rendered image through more accurate expression of depth values.

The effects of the present disclosure are not limited to those mentioned above, and other effects not mentioned will be clearly understood by those of ordinary skill in the art from the following description.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings.

DETAILED DESCRIPTION

In order to encode a plenoptic video based on such a plenoptic technology, the first related art transmits data of a specific view together with a depth image (i.e., depth information) instead of transmitting images of all views. This is because the omitted intermediate viewpoint images may be synthesized using the transmitted depth image. Accordingly, when encoding a plenoptic video, a depth image representing depth information about a distance between an object and a camera plays an important role, and is transmitted in an amount corresponding to texture information of a transmission view. However, in order to transmit data of a plurality of specific viewpoints, there is a problem in that a transmission bandwidth reaching several times to several tens of times the bandwidth required to transmit a general 2D image is required.

To solve the above problems, in ISO/IEC MPEG-I MIV (MPEG Immersive Video) which is one of the standard technologies for encoding/decoding a plenoptic video, a technology (second related art) for rearranging remaining slice regions (i.e., patches) to a 2D image after removing redundancy between multi-viewpoint images and then encoding the remaining slice regions into a 2D video compression codec optimized for the existing 2D image is proposed. However, in the case of the second related art, due to the discontinuity of the rearranged patches, the encoding/decoding process of the plenoptic video may not achieve proper encoding/decoding performance in terms of speed or compression efficiency.

Figure 1:
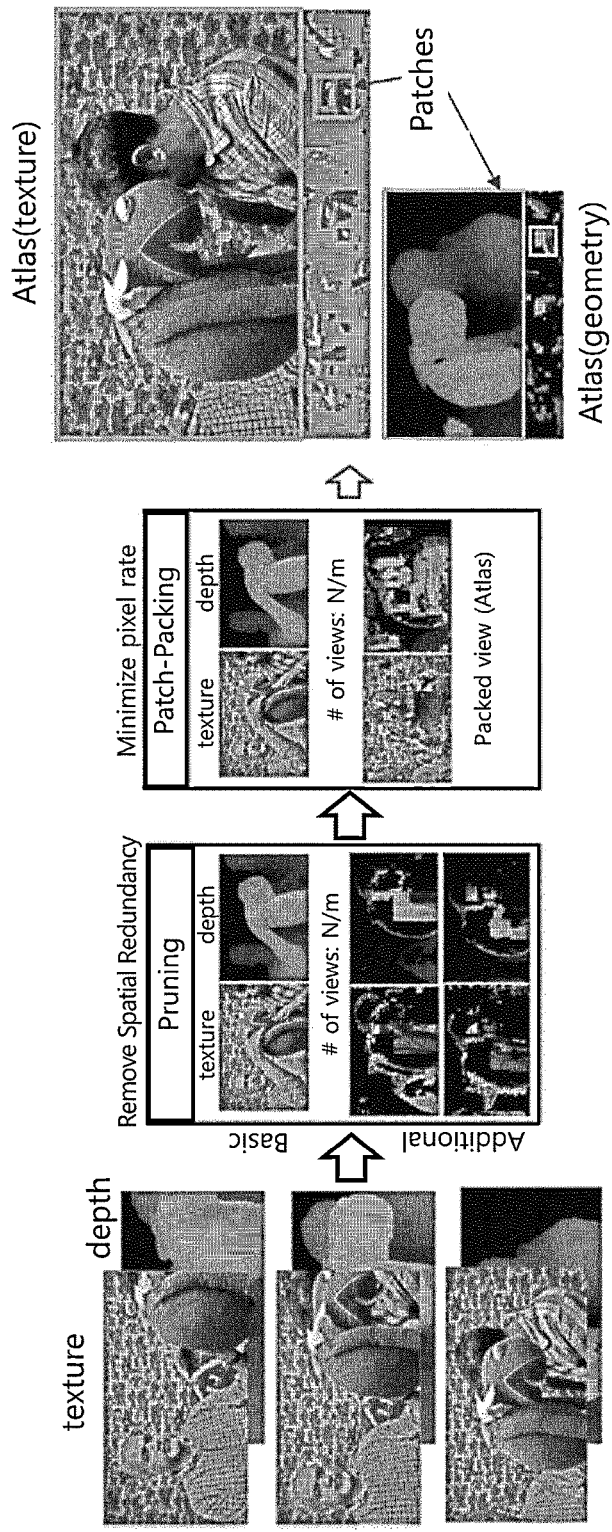
FIG. 1 illustrates an example of an operation process of MIV (Metadata for Immersive Video) mode of the MPEG-I MIV (MPEG Immersive Video) standard.

FIG. 1 illustrates an example of an operation process of MIV (Metadata for Immersive Video) mode of the MPEG-I MIV (MPEG Immersive Video) standard.

Accordingly, the MIV standard group developed Test Model for Immersive Video (TMIV), a test model for effectively encoding multi-viewpoint images. TMIV may operate in MIV (Metadata for Immersive Video) mode, and includes an encoder part for performing preprocessing before encoding a multi-viewpoint image and a decoder part for receiving a decoded image and rendering a random viewpoint image, respectively.

In this MIV mode, since depth information is essentially accompanied to render a random viewpoint image of a plenoptic video, and the depth information is transmitted to the decoder as separate image data, encoding and quantization losses inevitably occur. Accordingly, there is a need for a method for reducing loss occurring in depth information.

The above-mentioned objects, means, and effects thereof of the present disclosure will become more apparent from the following detailed description in relation to the accompanying drawings, and accordingly, those skilled in the art to which the present disclosure belongs will be able to easily practice the technical idea of the present disclosure. In addition, in describing the present disclosure, when it is determined that a detailed description of a related known technology may unnecessarily obscure the subject matter of the present disclosure, the detailed description will be omitted.

The terms used in this specification are for the purpose of describing embodiments only and are not intended to limit the present disclosure. In this specification, the singular forms "a,", "an," and "the" also include plural forms in some cases unless otherwise specified in the context. In this specification, terms such as "include", "comprise", "provide" or "have" do not exclude the presence or addition of one or more other elements other than elements mentioned.

In this specification, the terms such as "or" and "at least one" may represent one of the words listed together or a combination of two or more. For example, "A or B" and "at least one of A and B" may include only one of A or B, or may also include both A and B.

In this specification, descriptions according to "for example", etc. may not exactly match the information presented, such as the recited properties, variables, or values, and effects such as modifications, including tolerances, measurement errors, limits of measurement accuracy, and other commonly known factors should not limit the modes for carrying out the invention according to the various exemplary embodiments of the present disclosure.

In this specification, when an element is described as being "connected" or "linked" to another element, it will be understood that it may be directly connected or linked to the other element, but intervening elements may also be present. On the other hand, when an element is referred to as being "directly connected" or "directly linked" to another element, it will be understood that there are no intervening elements present.

In this specification, when an element is described as being "on" or "adjacent to" another element, it will be understood that it may be directly "on" or "connected to" the other element, but intervening elements may also be present. On the other hand, when an element is described as being "directly on" or "directly adjacent to" another element, it will be understood that there are no intervening elements present. Other expressions describing the relationship between the elements, for example, "between" and "directly between", and the like can be construed similarly.

In this specification, terms such as "first" and "second" may be used to describe various elements, but, the above elements should not be limited by the terms above. In addition, the above terms should not be construed as limiting the order of each element, and may be used for the purpose of distinguishing one element from another. For example, a "first element" may be named as a "second element" and similarly, a "second element" may also be named as a "first element."

Unless otherwise defined, all terms used in this specification may be used with meanings commonly understood by those of ordinary skill in the art to which the present disclosure belongs. In addition, terms defined in a commonly used dictionary are not interpreted ideally or excessively unless explicitly and specifically defined.

Hereinafter, a preferred embodiment according to the present disclosure will be described in detail with reference to the accompanying drawings.

Figure 2:
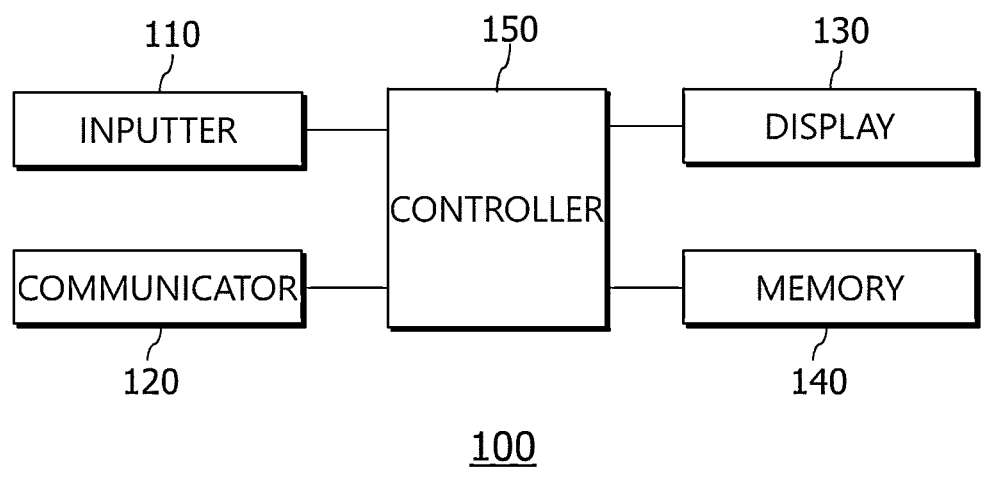
FIG. 2 illustrates a block diagram of an electronic apparatus according to an exemplary embodiment of the present disclosure.

FIG. 2 illustrates a block diagram of an electronic apparatus 100 according to an exemplary embodiment of the present disclosure.

The electronic apparatus 100 according to an embodiment of the present disclosure is an apparatus for processing encoding for compressing image data of a plenoptic video or processing decoding of a corresponding encoded code.

For example, the electronic apparatus 100 may be an apparatus for encoding a pre-stored plenoptic video, a server for providing a video service such as video on demand (VOD) or real-time streaming by encoding and transmitting the corresponding plenoptic video, or an apparatus for decoding an encoded code of a pre-stored or received plenoptic video according to the corresponding video service, but is not limited thereto.

The electronic apparatus 100 may operate in a MIV mode (Metadata for Immersive Video) during encoding/decoding. This MIV mode is the same as described above in the [Background], so it will be omitted below.

In particular, when operating in the MIV mode, the electronic apparatus 100 may generate an atlas by mapping a depth value for each patch. That is, the electronic apparatus 100 may again map the depth value by a minimum-maximum linear scaling method in units of a patch during encoding preprocessing of the plenoptic video, and the electronic apparatus 100 may generate a syntax for storing and transmitting a minimum value and a maximum value of the depth value per patch. In addition, the electronic apparatus 100 may decode the plenoptic video by restoring the original depth information using the corresponding syntax.

The electronic apparatus 100 may be a terminal capable of computing. For example, the electronic apparatus 100 may be a general-purpose computing system such as a desktop personal computer (PC), a laptop PC, a tablet PC, a netbook computer, a workstation, a personal digital assistant (PDA), a smartphone, a smart pad, or a mobile phone, or a dedicated embedded system implemented based on an embedded Linux, but is not limited thereto.

As shown in FIG. 2, the electronic apparatus 100 may include an inputter 110, a communicator 120, a display 130, a memory 140, and a controller 150. In this case, for encoding a cloud point, the memory 140 and the controller 150 may correspond to essential components, and the inputter 110, the communicator 120, and the display 130 may correspond to additional components.

The inputter 110 generates input data in response to various user inputs, and may include various input means. For example, the inputter 110 may include a keyboard, a keypad, a dome switch, a touch panel, a touch key, a touchpad, a mouse, a menu button, and the like, but is not limited thereto.

The communicator 120 is a component that performs communication with other apparatus, such as a server. For example, the communicator 120 may transmit encoded/decoded data for a plenoptic video to other apparatus. For example, the communicator 120 may perform wireless communication such as 5th generation communication (5G), long term evolution-advanced (LTE-A), long term evolution (LTE), Bluetooth, Bluetooth low energy (BLE), near field communication (NFC), and Wi-Fi communication, or may perform wired communication such as cable communication, but is not limited thereto.

The display 130 is a component for displaying various image data on a screen, and may be configured as a non-light emitting panel or a light emitting panel. For example, the display 130 may display a plenoptic video or the like before encoding or after decoding. For example, the display 130 may include a liquid crystal display (LCD), a light emitting diode (LED) display, an organic light emitting diode (OLED) display, a micro electro mechanical systems (MEMS) display, or an electronic paper display, but is not limited thereto. In addition, the display 130 may be combined with the inputter 120 to be implemented as a touch screen, etc.

The memory 140 stores various types of information necessary for the operation of the electronic apparatus 100. For example, the stored information of the memory 140 may include a plenoptic video, program information related to an encoding/decoding method to be described below, and the like, but is not limited thereto.

For example, the memory 140 may include, but is not limited to, a hard disk type, a magnetic media type, a compact disc read only memory (CD-ROM), an optical media type, a magneto-optical media type, a multimedia card micro type, flash memory type, a ROM type (read only memory type), or a RAM type (random access memory type) and the like depending on the type. In addition, the memory 140 may be a cache, a buffer, a main memory, an auxiliary memory, or a separately provided storage system depending on its purpose/location, but is not limited thereto.

The controller 150 may perform various control operations of the electronic apparatus 100. That is, the controller 150 may control the execution of an encoding/decoding method to be described later, and may control the operation of the remaining components of the electronic apparatus 100, that is, the inputter 110, the communicator 120, the display 130, the memory 140, and the like. For example, the controller 150 may include, but is not limited to, a processor that is hardware or a process that is software executed by the corresponding processor, or the like. For example, the processor may include a microprocessor, a central processing unit (CPU), a processor core, a multiprocessor, an application-specific integrated circuit (ASIC), a field programmable gate array (FPGA), or the like, but is not limited thereto.

Figure 3:
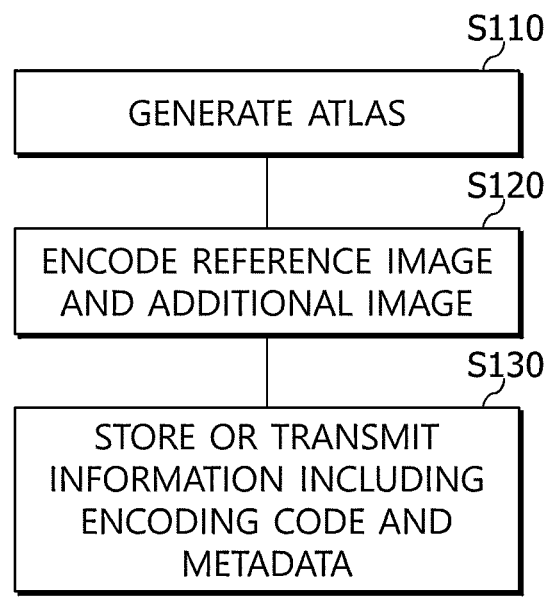
FIG. 3 illustrates a flowchart of an encoding method according to an exemplary embodiment of the present disclosure.

FIG. 3 illustrates a flowchart of an encoding method according to an exemplary embodiment of the present disclosure.

Figure 4:
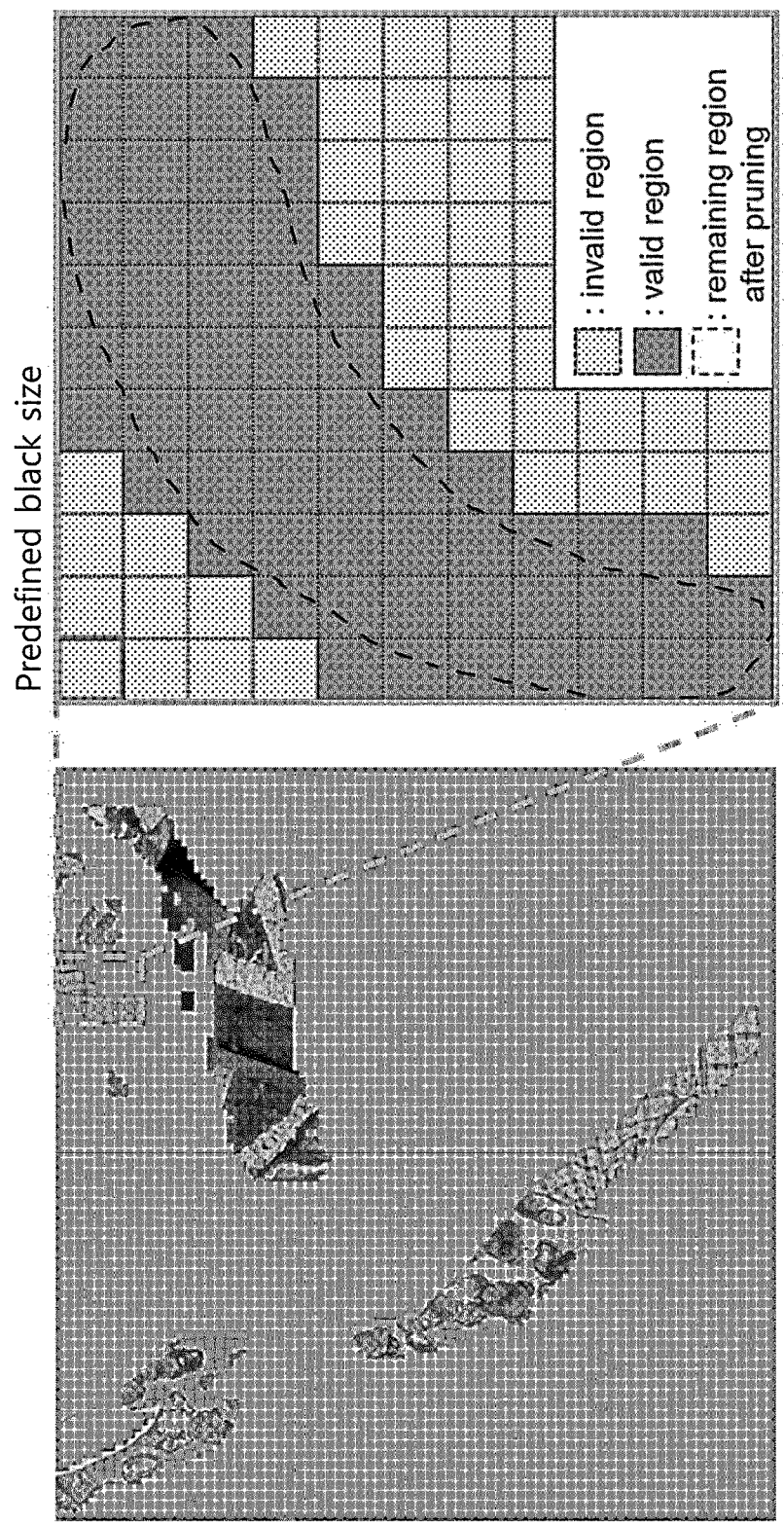
FIG. 4 illustrates an example in which a valid region in a patch is formed in units of blocks.

The encoding method according to an embodiment of the present disclosure is a method for encoding a plenoptic video based on a MIV mode in the electronic apparatus 100, and includes S110 to S130 as shown in FIG. 4. In this case, the execution of the S110 to S130 may be controlled through a processor or a process of the controller 150. Such S110 to S130 may also be referred to as a "encoding process." That is, the controller 150 of the electronic apparatus 100 may include an MIV mode encoder for performing an encoding process.

First, S110 is a step of generating an atlas including a patch by classifying a reference image and an additional image from the plenoptic video and then by using the additional image.

That is, it receives images from multiple viewpoints in the plenoptic video as input, selects a few reference images among them, and classifies the remaining images as additional images. For each of the classified additional images, a viewpoint at the same location as the reference image is synthesized based on the corresponding depth image. By comparing the synthesized image with the reference image, a region that can be synthesized with the information of the reference image is removed from the corresponding additional image. In this case, some regions in the finally remaining additional image are referred to as "patches."

One patch includes both a valid region including residual pixels to be transmitted and an invalid region that is a removed portion. The process of collecting patches generated from each additional image into a two-dimensional image space referred to as atlas is referred to as packing.

In particular, the patches packed in the atlas are densely packed so that the valid regions do not overlap each other and the space occupied by the patches is minimized. In order to reduce the packing space as much as possible, patches may be rotated and packed, and packing position and rotation information of each patch are included in metadata. In this case, the metadata is used in a decoding process to be described later, in which patches randomly packed in the atlas are restored to their original positions at additional viewpoints. That is, in S110, metadata for the atlas is separately generated while generating the atlas.

FIG. 4 illustrates an example in which a valid region in a patch is formed in units of blocks.

Referring to FIG. 4, the valid region within the patch is formed according to a block lattice of a specific size, and the block size is determined according to the accuracy of depth information of an input sequence. In a computer graphic sequence having relatively accurate depth information, the block size (PatchPackingBlockSize) is selected as 16×16 or the like having a relatively small size, and in a natural image sequence having relatively low accuracy of depth information, the block size is selected as 32×32 or the like having a relatively large size. That is, FIG. 4 shows how the valid region in a rectangular patch is formed according to a lattice shape.

Next, S120 is a step of generating an encoding code by encoding the reference image and the atlas using a 2D video codec.

That is, the atlas image and the reference image in which the patches are packed according to S110 may be input to the 2D video encoder and encoded according to various video codecs. For example, a standard video codec such as VP8 (Video Processor 8), VP9 (Video Processor 9), HEVC (High Efficiency Video Coding), AV1 (AOMedia Video 1), VVC (Versatile Video Coding), and MPEG-4 may be used, but, is not limited thereto.

Next, S130 is a step of storing information including an encoding code and metadata (hereinafter referred to as "composite image information") in the memory 140 or generating the corresponding composite image information as a bit-stream and transmitting it to other apparatus through the communicator 120.

As an example, the other apparatus may be an electronic apparatus equipped with an MIV mode decoder and the like to perform a decoding process to be described later, but is not limited thereto.

<S110 Related Technology>

As described above, in order to render a random viewpoint image through a plenoptic video, depth information is essentially accompanied. However, since the depth information is included in composite image information as separate image data and is stored or transmitted to a decoder, encoding and quantization losses inevitably occurs.

Accordingly, in order to reduce the losses occurring in the depth information during the decoding process, a method of remapping a depth value by applying a minimum-maximum linear scaling in units of an input viewpoint image (hereinafter, referred to as "first improvement technique") may be implemented in S110.

In the case of the first improvement technique (which may be referred to as "first improvement process"), depth minimum value and maximum value information before mapping the depth value for each viewpoint image are included in the metadata, and the original depth value is restored through the corresponding depth minimum value and maximum value information included in the metadata and used for viewport rendering during the decoding process to be described later. Through the above-described technique, the dynamic range for expressing the depth value is increased, so that the more accurate depth information can be expressed and transmitted.

Figure 5:
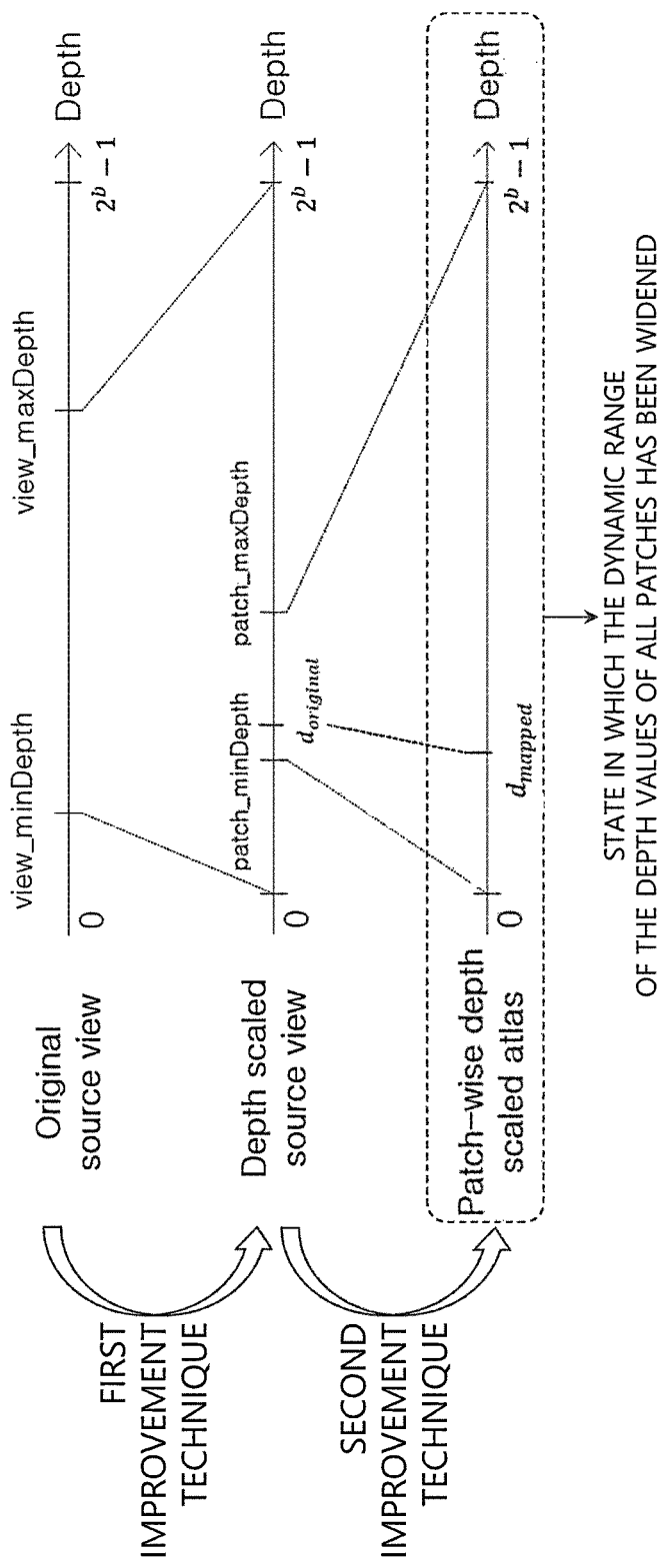
FIG. 5 illustrates a conceptual diagram of various improvement techniques for generating atlas according to an exemplary embodiment of the present disclosure.

FIG. 5 illustrates a conceptual diagram of various improvement techniques for S110 according to an exemplary embodiment of the present disclosure.

For example, referring to FIG. 5, a method of mapping a minimum value and a maximum value of a depth value for each input viewpoint image to 0 and $2^b-1$, respectively, and linearly mapping the values therebetween is used. In this case, b is a bit depth for expressing the depth value, and is a natural number of 2 or more. In addition, the minimum value and the maximum value of the depth value may mean a minimum value and a maximum value in a predetermined number of image frame units.

According to the first improvement technique, when the dynamic range of the depth value is widely used, it is advantageous in that it is made more robust to an error for the corresponding depth information generated during the process of storing or transmitting the depth information that is included in the composite image information, and finally, it is advantageous in that the objective and subjective image quality of the viewport image rendered during the decoding process to be described later is improved. However, in the first improvement technique, the depth dynamic range is not maximally used, and thus, it is necessary to further improve the depth dynamic range.

Accordingly, after performing the first improvement technique by further improving the first improvement technique, a method of remapping the depth value for each patch (hereinafter, referred to as "second improvement technique") may be implemented as shown in FIG. 5.

That is, in the state of performing the first improvement technique, the second improvement technique (which may be referred to as "second improvement process") relocates the minimum value and the maximum value of the depth value for each patch, and based on them, the depth value is remapped through minimum-maximum linear scaling. Similarly, in the second improvement technique, the minimum value and the maximum value of the depth value per patch mean a minimum value and a maximum value in a predetermined number of image frame units.

In the case of the second improvement technique, depth minimum value and maximum value information before mapping the depth value for each viewpoint image are additionally included in the metadata, and the original depth value is restored through the corresponding depth minimum value and maximum value information included in the metadata and used for viewport rendering during the decoding process to be described later. Through the above-described technique, the dynamic range for expressing the depth value is further increased compared to the first improvement technique, so that the more accurate depth information can be expressed and transmitted.

In particular, according to the second improvement technique, within the range of the minimum value and the maximum value of the depth value per patch, a depth value for a specific point (hereinafter, referred to as "first depth value $d_{original}$") in a specific patch in the first improvement technique may be mapped to a depth value according to a mapping of the corresponding patch (hereinafter, referred to as "second depth value d mapped"). In this case, a first depth value $d_{original}$ may be mapped to a second depth value $d_{mapped}$ according to a magnification f at which a dynamic range of the depth value per patch (hereinafter, referred to as "depth dynamic range") is extended.

For example, a detailed equation for this may be represented by the following Equation 1.

$$d_{mapped} = f \times (d_{original} - \text{patchMinDepth}) \quad \text{(Equation 1)}$$

For reference, "patchMinDepth" denotes the minimum value of a specific patch according to the second improvement technique, and "patchMaxDepth" denotes the maximum value of a specific patch according to the second improvement technique.

However, the magnification f at which the depth dynamic range is extended may be limited, and the value of f according to this limitation may be expressed as in Equation 2 below.

$$f = \min\left(2^n, \frac{(2^b - 1)}{\text{patchMaxDepth} - \text{patchMinDepth}}\right) \quad \text{(Equation 2)}$$

In this case, min(A, B) represents a smaller value among A and B, and n may be a value of 0 to m ($0 \leq n \leq m$). Where, m may be a real number of 1.0 or more, preferably 6.

In addition, the depth value mapping method per patch according to the second improvement technique may be applied only to a specific patch rather than to all patches. That is, the second improvement technique may be applied only when the size (width or depth) of the patch exceeds a predetermined threshold value.

For example, the patch size threshold value for determining whether to apply the second improvement technique may be set to p times the block size (PatchPackingBlockSize) (where p is a natural number of 4 or less).

<Detailed Description According to the Second Improvement Technique>

In order to restore the original depth value in a decoding process to be described later, the depth minimum value and maximum value for each patch are included in patch metadata, encoded, and stored or transmitted. In this case, as a method of minimizing the amount of data to be stored or transmitted, one of the following methods may be used.

(1) a minimum value/maximum value of the original depth value for each patch is stored in the metadata.

That is, according to the second improvement technique, a minimum value/maximum value of an original depth value per patch may be stored in the metadata, and any one of the following (1-1) to (1-3) may be selected as a method for minimizing the amount of the data.

(1-1) The index of the current patch in the order in which the patch is packed may be referred to as i, where i is a natural number of 2 or more. In this case, the (minimum value and maximum value) of the depth value in the $i^{th}$ patch may be represented as (patchMinDepth$_i$, patchMaxDepth$_i$) and the (minimum value and maximum value) of the depth value in the i−1th patch may be represented as (patchMinDepth$_{i-1}$, patchMaxDepth$_{i-1}$), respectively.

Accordingly, instead of the (minimum value and maximum value) of the $i^{th}$ patch, a difference between the $i^{th}$ (minimum value and maximum value) and the (i−1)th patch (minimum value and maximum value) may be stored in the metadata. In this case, the difference may be represented as (patchMinDepth$_i$−patchMinDepth$_{i-1}$, patchMaxDepth$_i$−patchMaxDepth$_{i-1}$). However, the minimum value and the maximum value of the depth value of the first packed patch (i.e., the first patch) are stored in the metadata as it is.

(1-2) any one of the minimum value (patchMinDepth) and the maximum value (patchMaxDepth) of the depth value per patch, and a range of the depth value per patch (patchDepthRange=patchMaxDepth−patchMinDepth) are respectively stored. For example, the minimum value (patchMinDepth) of the depth value per patch is stored as it is, but the maximum value (patchMaxDepth) is stored instead as a value corresponding to the range of the depth value per patch (patchDepthRange=patchMaxDepth−patchMinDepth). Of course, the maximum value (patchMaxDepth) of the depth value per patch may be stored as it is, but the minimum value (patchMinDepth) may be stored instead as a value corresponding to the range of the depth value per patch (patchDepthRange=patchMaxDepth−patchMinDepth).

(1-3) After using the method (1-2) described above, the method (1-1) described above is additionally used. That is, the method (1-1) may be used for the minimum value of the depth value per patch, and the method (1-2) may be used for the maximum value, but it is not limited thereto.

For example, the (patchMinDepth−lastPatchMinDepth, patchDepthRange−lastPatchDepthRange) which is the difference between the (patchMinDepth, patchDepthRange) which is the (minimum value, range) of the depth value per patch and the (lastPatchMinDepth, lastPatchDepthRange) which is the (minimum value, range) of the depth value per patch previously stored last may be stored in the metadata. In this case, the initial value of the (lastPatchMinDepth, lastPatchDepthRange) which is the (minimum value, range) of the depth value per patch previously stored last may be set to (viewMinDepth, viewDepthRange=viewMaxDepth−viewMinDepth) which is the (minimum value, range) of the depth value of the viewpoint image attributable to the first patch. In addition, the value of (lastPatchMinDepth, lastPatchDepthRange) may be updated after calculating (patchMinDepth, patchMaxDepth) for each patch that uses depth scaling in the encoding or decoding process.

(2) A flag indicating whether to apply the depth value mapping method per sequence is transmitted Meanwhile, the depth value mapping method according to the second improvement technique may not be applied in some cases. That is, according to characteristics of the depth image of the input sequence (patch or image), the depth value mapping method according to the second improvement technique may not be applied to the corresponding patch or the corresponding input viewpoint image.

Accordingly, a flag indicating whether to apply the depth value mapping method according to the second improvement technique is included in the sequence parameter and stored in the metadata. For example, the case where the depth value mapping method according to the second improvement technique is not applied may correspond to the following (2-1) or (2-2).

(2-1) a case where the depth information of the input sequence has a relatively low accuracy (accuracy of less than or equal to a certain degree of accuracy)

(2-2) a case where the sample distribution interval is large in the histogram of the depth image of the input sequence (a case where the sample distribution interval is equal to or greater than a predetermined level)

Next, a decoding method according to an embodiment of the present disclosure will be described.

Figure 6:
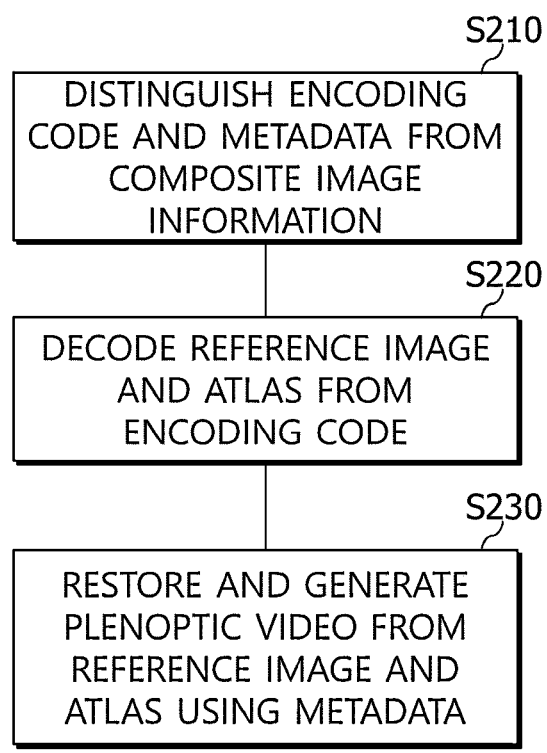
FIG. 6 illustrates a flowchart of a decoding method according to an exemplary embodiment of the present disclosure.

FIG. 6 illustrates a flowchart of a decoding method according to an exemplary embodiment of the present disclosure.

The decoding method according to an embodiment of the present disclosure is a method for decoding composite image information of a plenoptic video based on a MIV mode in the electronic apparatus 100, and includes S210 to S230 as shown in FIG. 6. In this case, the execution of the S210 to S230 may be controlled through a processor or a process of the controller 150. Such S210 to S230 may also be referred to as a "decoding process." That is, the controller 150 of the electronic apparatus 100 may include an MIV mode decoder for performing a decoding process.

First, S210 is a step of distinguishing an encoding code and metadata from composite image information stored in the memory 140 or received through the communicator 120. Such S210 may correspond to a decoding process corresponding to S130.

Next, S220 is a step of performing decoding of a reference image and atlas from the encoding code using a 2D video codec. Such S210 may correspond to a decoding process corresponding to S120.

Next. S230 is a step of restoring and generating a plenoptic video from a reference image and atlas using metadata. Such S210 may correspond to a decoding process corresponding to S110. That is, the original depth value can be restored through the depth minimum value and maximum value information included in the metadata and used for viewport rendering.

Accordingly, the controller 150 of the electronic apparatus 100 may reproduce the restored and generated plenoptic video through the display 130.

The present disclosure configured as described above has an advantage of reducing loss of depth information occurring during encoding/decoding of a plenoptic video by generating an atlas by mapping depth value per patch. In addition, the present disclosure has an advantage in that by performing a minimum-maximum linear scaling of a depth value in units of a patch for effective depth information representation, thereby improving a method of taking the method of minimum-maximum linear scaling of a depth value in units of an input viewpoint image, the depth value can be expressed more accurately with a wider dynamic range. That is, the present disclosure has an advantage of enabling efficient plenoptic video encoding/decoding by minimizing depth information loss in the encoding process by performing minimum-maximum linear scaling of a depth value in units of a patch. In addition, the present disclosure has an advantage of objectively and subjectively improving the image quality of a rendered image through more accurate expression of depth values.

In the detailed description of the present disclosure, although specific embodiments have been described, it is apparent that various modifications are possible without departing from the scope of the present disclosure. Therefore, the scope of the present disclosure is not limited to the described embodiments, and should be defined by the following claims and their equivalents.

What is claimed is:

1. A method performed in an electronic apparatus to classify a reference image and an additional image from a plenoptic video during encoding the plenoptic video and then generate an atlas including a patch using the additional image, the method comprising:

mapping a depth value by performing a minimum-maximum linear scaling of the depth value in each of patches of an input image; and finding a minimum value and a maximum value of the depth value per the patch and remapping the depth value through minimum-maximum linear scaling.

2. The method of claim 1, wherein the mapping comprises storing information of a minimum value and a maximum value of the depth value before mapping the depth value per the patch in metadata.

3. The method of claim 1, further comprising performing the finding only when a size of the patch exceeds a predetermined threshold value.

4. The method of claim 1, wherein the finding comprises mapping a first depth value $d_{original}$ which is a depth value for a specific point in the patch according to the mapping within a range of a minimum value to a maximum value of the depth value per the patch to a second depth value $d_{mapped}$ which is a depth value according to the mapping of the patch, in which the first depth value $d_{original}$ is mapped to the second depth value $d_{mapped}$ according to a magnification f at which a dynamic range of the depth value per the patch is extended.

5. The method of claim 4, wherein the second depth value $d_{mapped}$ is obtained using Equation 1 below:

$$d_{mapped} = f \times (d_{original} - \text{patchMinDepth}) \qquad \text{(Equation 1)}$$

(where, patchMinDepth represents a minimum value of the patch according to the second step).

6. The method of claim 4, wherein the magnification f is limited within a predetermined range, and a value of f according to the limitation is obtained using Equation 2 below:

$$f = \min\left(2^n, \frac{(2^b - 1)}{\text{patchMaxDepth} - \text{patchMinDepth}}\right) \qquad \text{(Equation 2)}$$

(where, min (A, B) represents a smaller value among A and B, a minimum value and a maximum value of the depth value are respectively mapped to 0 and $2^{b-1}$ in the first step, b is a natural number of 2 or more as a bit depth for expressing the depth value, patchMaxDepth represents the maximum value of the patch according to a second improvement technique, and n may be a value of 0 to m ($0 \leq n \leq m$). Where, m may be a real number of 1.0 or more).

7. The method of claim 1, wherein the minimum value and the maximum value of the depth value per patch are a minimum value and a maximum value in a predetermined number of image frame units.

8. The method of claim 1, wherein the finding comprises storing in metadata (patchMinDepth$_i$−patchMinDepth$_{i-1}$, patchMaxDepth$_i$−patchMaxDepth$_{i-1}$) which is a difference between (patchMinDepth$_i$, patchMaxDepth$_i$) which is a (minimum value, maximum value) of the depth value in an $i^{th}$ patch, where i is a natural number of 2 or more and (patchMinDepth$_{i-1}$, patchMaxDepth$_{i-1}$) which is a (minimum value, maximum value) of the depth value in an (i-1)$^{th}$ patch.

9. The method of claim 1, wherein any one of the minimum value (patchMinDepth) and the maximum value (patchMaxDepth) of the depth value per patch, and a range of the depth value per patch (patchDepthRange=patchMaxDepth-patchMinDepth) are respectively stored in metadata.

10. The method of claim 1, wherein:
(patchMinDepth−lastPatchMinDepth, patchDepthRange−lastPatchDepthRange) which is a difference between (patchMinDepth, patchDepthRange) which is the (minimum value, range) of the depth value per patch and (lastPatchMinDepth, lastPatchDepthRange) which is the (minimum value, range) of the depth value per patch previously stored last are stored in metadata, the initial value of the (lastPatchMinDepth, lastPatchDepthRange) which is the (minimum value, range) of the depth value per patch previously stored last is (viewMinDepth, viewDepthRange=viewMaxDepth−viewMinDepth) which is the (minimum value, range) of the depth value of the input image attributable to the first patch, and the value of (lastPatchMinDepth, lastPatchDepthRange) is updated after calculating (patchMinDepth, patchMaxDepth) for each patch that uses depth scaling in the encoding or decoding process.

11. The method of claim 1, further comprising selectively performing the finding with respect to a corresponding patch or a corresponding input image according to a depth image characteristic of an input sequence.

12. The method of claim 11, wherein the selectively performing comprises not performing the finding in response to the depth information of the input sequence being less than or equal to a certain degree of accuracy determined based on a block size of the patch.

13. The method of claim 11, wherein the selectively performing comprises not performing the finding in response to a histogram of the depth image of the input sequence having a sample distribution interval equal to or greater than a predetermined level.

14. A method performed by an electronic apparatus to perform encoding on a plenoptic video, the method comprising:
 generating an atlas including a patch by classifying a reference image and an additional image from the plenoplic video and then by using the additional image;
 generating an encoding code by encoding the reference image and the atlas using a 2D video codec; and
 storing information including the encoding code and metadata or generating the information as a bit-stream and transmitting it to other apparatus,
 wherein generating the atlas comprises:
 mapping a depth value by applying minimum-maximum linear scaling in each of patches of an input image; and
 finding a minimum value and a maximum value of the depth value per the patch and remapping the depth value through minimum-maximum linear scaling,
 wherein the finding comprises storing information of a minimum value and a maximum value of the depth value before mapping the depth value per the patch in the metadata.

15. An apparatus, comprising:
 a memory storing a plenoptic video; and
 a controller configured to control to classify a reference image and an additional image from the plenoptic video during encoding the plenoptic video and then generate an atlas including a patch using the additional image,
 wherein the controller is configured to:
 map a depth value by applying minimum-maximum linear scaling in each of patches of an input image,
 find a minimum value and a maximum value of the depth value per the patch and remapping the depth value through minimum-maximum linear scaling, and
 store information of a minimum value and a maximum value of the depth value before mapping the depth value per the patch in metadata when the controller finds the minimum value and the maximum value of the depth value.

16. The apparatus of claim 15, wherein the controller is configured to map a first depth value $d_{original}$ which is a depth value for a specific point in the patch according to the first improvement process within a range of a minimum value to a maximum value of the depth value per the patch to a second depth value $d_{mapped}$ which is a depth value according to the mapping of the patch, in which the first depth value $d_{original}$ is mapped to the second depth value $d_{mapped}$ according to a magnification f at which a dynamic range of the depth value per the patch is extended.

17. The apparatus of claim 15, wherein the controller is configured to store in metadata (patchMinDepth$_i$−patchMinDepth$_{i-1}$, patchMaxDepth$_i$−patchMaxDepth$_{i-1}$) which is a difference between (patchMinDepth$_i$, patchMaxDepth$_i$) which is a (minimum value, maximum value) of the depth value in an $i^{th}$ patch where i is a natural number of 2 or more and (patchMinDepth$_{i-1}$, patchMaxDepth$_{i-1}$) which is a (minimum value, maximum value) of the depth value in an $(i-1)^{th}$ patch when the second improvement process is performed.

18. The apparatus of claim 15, wherein the controller is configured to store any one of the minimum value (patchMinDepth) and the maximum value (patchMaxDepth) of the depth value per patch, and a range of the depth value per patch (patchDepthRange=patchMaxDepth−patchMinDepth) in metadata, respectively, when the second improvement process is performed.

19. The apparatus of claim 15, wherein the controller is configured to:
 store in metadata (patchMinDepth−lastPatchMinDepth, patchDepthRange−lastPatchDepthRange) which is a difference between (patchMinDepth, patchDepthRange) which is the (minimum value, range) of the depth value per patch and (lastPatchMinDepth, lastPatchDepthRange) which is the (minimum value, range) of the depth value per patch previously stored last,
 set the initial value of the (lastPatchMinDepth, lastPatchDepthRange) which is the (minimum value, range) of the depth value per patch previously stored last to (viewMinDepth, viewDepthRange=viewMaxDepth−viewMinDepth) which is the (minimum value, range) of the depth value of the input image attributable to the first patch, and
 update the value of (lastPatchMinDepth, lastPatchDepthRange) after calculating (patchMinDepth, patchMaxDepth) for each patch that uses depth scaling in the encoding or decoding process.

20. The apparatus of claim 1, wherein the controller is configured to selectively perform the finding on the corresponding patch or the corresponding input image according to a depth image characteristic of an input sequence.

* * * * *